(12) United States Patent
Amor Molares et al.

(10) Patent No.: US 8,638,375 B2
(45) Date of Patent: Jan. 28, 2014

(54) RECORDING DATA WITH AN INTEGRATED FIELD-PORTABLE DEVICE

(75) Inventors: Jose Miguel Amor Molares, Thorton, CO (US); Gang Lu, Cupertino, CA (US); Julian Idle, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 226 days.

(21) Appl. No.: 13/109,897

(22) Filed: May 17, 2011

(65) Prior Publication Data

US 2012/0293678 A1 Nov. 22, 2012

(51) Int. Cl.
*H04N 5/76* (2006.01)

(52) U.S. Cl.
USPC ............... 348/231.3; 348/222.1; 348/333.02

(58) Field of Classification Search
USPC ...................... 348/222.1, 231.3, 333.02
See application file for complete search history.

(56) References Cited

U.S. PATENT DOCUMENTS

| | | | |
|---|---|---|---|
| 5,003,329 A | 3/1991 | Itabashi | |
| 5,103,250 A | 4/1992 | Arifuku et al. | |
| 5,247,356 A | 9/1993 | Ciampa | |
| 5,427,356 A | 6/1995 | Krotov et al. | |
| 5,506,644 A | 4/1996 | Suzuki et al. | |
| 5,517,419 A | 5/1996 | Lanckton et al. | |
| 5,581,299 A | 12/1996 | Raney | |
| 5,646,207 A | 7/1997 | Schell | |
| 5,689,742 A | 11/1997 | Chamberlain | |
| 5,768,640 A | 6/1998 | Takahashi et al. | |
| 5,845,161 A | 12/1998 | Schrock et al. | |
| 5,897,728 A | 4/1999 | Cole et al. | |
| 5,913,078 A | 6/1999 | Kimura et al. | |
| 5,966,122 A | 10/1999 | Itoh | |
| 6,076,917 A | 6/2000 | Wen | |
| 6,128,446 A | 10/2000 | Schrock et al. | |
| 6,222,985 B1 | 4/2001 | Miyake et al. | |
| 6,282,362 B1 * | 8/2001 | Murphy et al. | ............... 386/224 |
| 6,337,951 B1 | 1/2002 | Nakamura | |
| 6,401,069 B1 | 6/2002 | Boys et al. | |
| 6,504,571 B1 | 1/2003 | Narayanaswami et al. | |
| 6,690,883 B2 | 2/2004 | Pelletier | |
| 6,993,196 B2 | 1/2006 | Sun et al. | |
| 7,234,106 B2 | 6/2007 | Simske | |
| 7,465,323 B2 | 12/2008 | Au et al. | |
| 7,541,975 B2 | 6/2009 | Sever et al. | |
| 7,617,246 B2 | 11/2009 | Koch et al. | |
| 2005/0209815 A1 | 9/2005 | Russon et al. | |
| 2006/0061595 A1 | 3/2006 | Goede et al. | |
| 2007/0236581 A1 * | 10/2007 | Uchiyama et al. | ......... 348/222.1 |
| 2009/0086047 A1 * | 4/2009 | Suehiro | ..................... 348/222.1 |
| 2011/0064312 A1 | 3/2011 | Janky et al. | |
| 2012/0088526 A1 * | 4/2012 | Lindner | ........................ 455/457 |
| 2012/0105475 A1 * | 5/2012 | Tseng | ........................... 345/633 |

* cited by examiner

*Primary Examiner* — Gevell Selby

(57) ABSTRACT

An integrated field-portable device comprising an image capture device configured to capture an image of a survey target area and a position determination system for determining a position of the integrated field-portable device, and an annotation system configured to access the image and associate the image with the position of at least one target in the survey target area and to associate with the image an instance of additional data comprising an identifier of the survey target area. The integrated field-portable device further comprises a storage system configured to generate a digital representation when the image is captured comprising the image, the position of the at least one target and the instance of additional data.

26 Claims, 14 Drawing Sheets

| DATUM | | LOCATION | | | | | | | |
|---|---|---|---|---|---|---|---|---|---|
| ☐ | COLLECTOR POSITION (401) | ☐ | LEFT | ☐ | RIGHT | ☐ | TOP | ☐ | BOTTOM |
| ☐ | TARGET POSITION (402) | ☐ | LEFT | ☐ | RIGHT | ☐ | TOP | ☐ | BOTTOM |
| ☐ | TARGET DIRECTION (403) | ☐ | LEFT | ☐ | RIGHT | ☐ | TOP | ☐ | BOTTOM |
| ☐ | TARGET DISTANCE (404) | ☐ | LEFT | ☐ | RIGHT | ☐ | TOP | ☐ | BOTTOM |
| ☐ | SV SIGNAL STRENGTH (405) | ☐ | LEFT | ☐ | RIGHT | ☐ | TOP | ☐ | BOTTOM |
| ☐ | SV DOP (406) | ☐ | LEFT | ☐ | RIGHT | ☐ | TOP | ☐ | BOTTOM |
| ☐ | TARGET CODE (407) | ☐ | LEFT | ☐ | RIGHT | ☐ | TOP | ☐ | BOTTOM |
| ☐ | TARGET CONDITION (408) | ☐ | LEFT | ☐ | RIGHT | ☐ | TOP | ☐ | BOTTOM |
| ☐ | FILE EXTENSION (409) | ☐ | JPEG | ☐ | GIF | ☐ | EXIF | ☐ | BITMAP |
| ☐ | DATE (412) | ☐ | LEFT | ☐ | RIGHT | ☐ | TOP | ☐ | BOTTOM |
| ☐ | TIMESTAMP (413) | ☐ | LEFT | ☐ | RIGHT | ☐ | TOP | ☐ | BOTTOM |
| ☐ | ALTITUDE (414) | ☐ | LEFT | ☐ | RIGHT | ☐ | TOP | ☐ | BOTTOM |

☐ EMBED SV POSITIONS (410)

SAVE (411)

FIG. 4

RECORDING DATA WITH AN INTEGRATED FIELD-PORTABLE DEVICE

BACKGROUND

Geographic data is increasingly used to provide geo-spatial data to a wide variety of business, government, and academic applications. Increasingly, remote Global Navigation Satellite System (GNSS) receivers are used to collect position data in a wide variety of electronic devices. For example, the GNSS receivers are now incorporated into cellular telephones, personal digital assistants (PDAs), dedicated navigation devices, surveying instruments, construction equipment, etc. Additionally, GNSS receivers are often used to monitor the geographic position of high value items such as vehicles, laptop computer systems, or even packages which are being shipped. Thus, there are a wide variety of commercially available devices which utilize satellite navigation technology.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

FIG. 4 shows an example annotation interface used in accordance with various embodiments.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "receiving," "accessing," "appending," "merging," "generating," "creating," "accessing," "embedding," or the like, often (but not always) refer to the actions and processes of a computer system or similar electronic computing device. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Overview of Discussion

Example units, systems, and methods for recording data with an integrated field-portable device are described herein. Discussion begins with description of an integrated field-portable device in accordance with various embodiments. A discussion of embedding expected GNSS satellite position data follows. Next is a discussion of an example annotation interface used in accordance with various embodiments. Discussion then turns to description of an example GNSS receiver which may be used in various portions of the sensor unit and sensor system. An example computer system is then described, with which or upon which various components, method procedures, or portions thereof may be implemented. Finally, there is a discussion of a method of recording data with an integrated field-portable device in accordance with various embodiments.

Example Integrated Field-Portable Device

Figure 1:
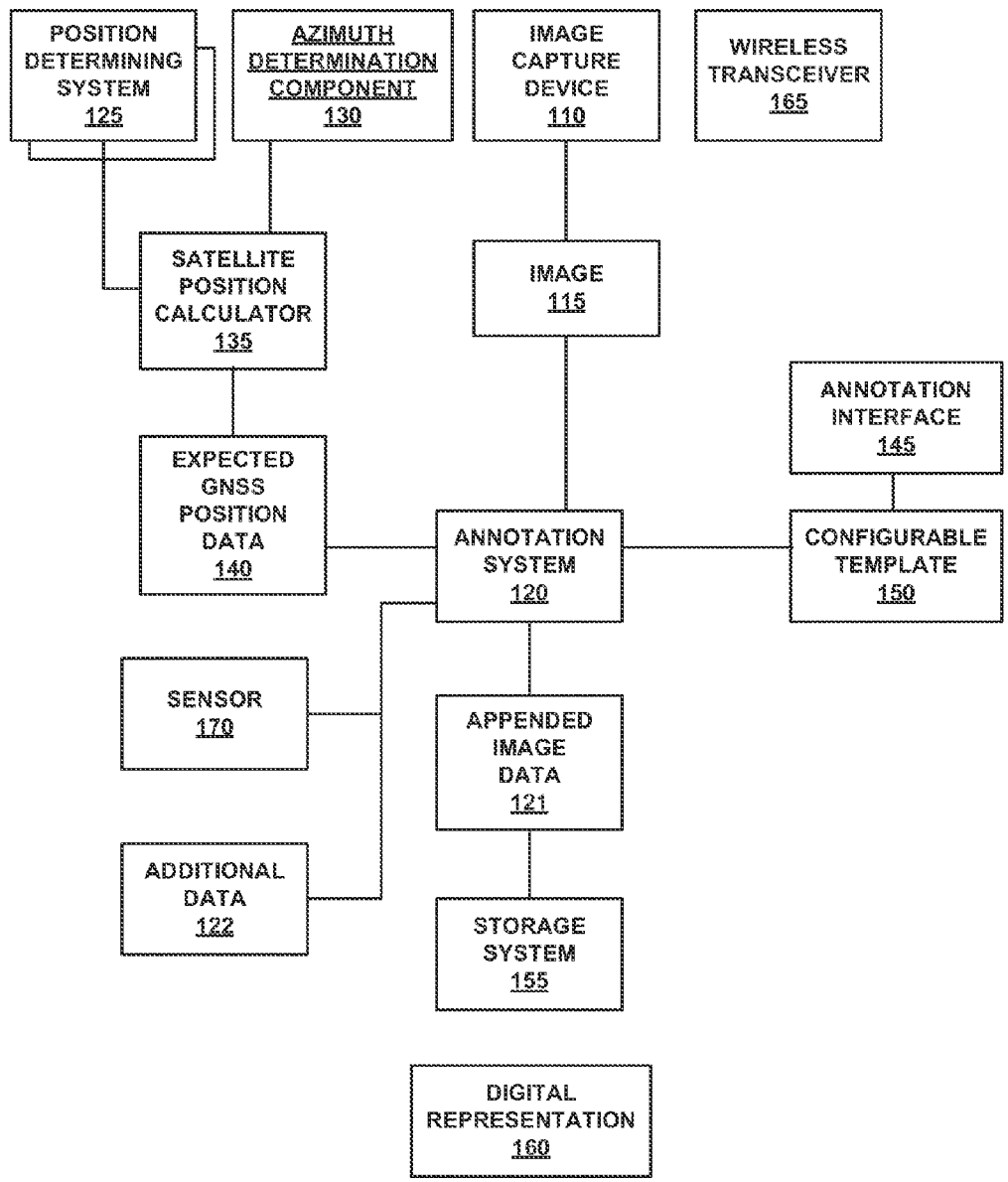
FIG. 1 is a diagram of an example integrated field-portable device in accordance with an embodiment.

FIG. 1 is a block diagram of an example integrated field-portable device 100 in accordance with an embodiment. In accordance with various embodiments, integrated field-portable device 100 can be a dedicated field data collection device such as a Geographic Information Systems (GIS) data recorder, or a field surveying or monitoring station. One example of such a robotic surveying station is the S8 Total Station which is commercially available from Trimble Navigation Limited of Sunnyvale Calif. Alternatively, integrated field-portable device 100 can be implemented as a smart phone, personal digital assistant (PDA), netbook, notebook computer, tablet computer in accordance with other embodiments. In FIG. 1, an image capture device 110 is configured to capture an image 115 of a survey target area. In various embodiments, image capture device 110 is configured to capture still and/or moving pictures of a survey target area. In one embodiment, image capture device 110 uses a catadioptric sensor system which uses mirrors and lenses to transmit light to an image sensor. In accordance with various embodiments, image capture device 110 can use a variety of image sensors including, but not limited to, a charge-coupled device (CCD) and an active-pixel sensor (APS) sensor which is also referred to as a CMOS sensor. Additionally, image capture device 110 may use one or more of a variety of lenses including, but not limited to, a wide-angle lens, a fish-eye lens, a panoramic lens in accordance with various embodiments to capture an image of a survey target area.

The image 115 is sent to an annotation system 120 which is configured to access and/or display image 115 and to associate it with additional data. As will be discussed in greater detail below, annotation system 120 utilizes a configurable template (e.g., 150 of FIG. 1) which specifies what types of data are to be associated and/or appended to image 115, and their locations, according to default settings or specifically determined settings.

In FIG. 1, integrated field-portable device 100 further comprises a position determination system 125 configured to determine a position of integrated field-portable device 100 and/or other objects such as a target (e.g., 210 of FIG. 2) within the survey target area. In accordance with one embodiment, position determination system 125 comprises a satellite navigation antenna and receiver configured to determine the position of integrated field-portable device 100 based upon received satellite signals. In accordance with one embodiment, image capture device 110 is disposed in a fixed orientation within integrated field-portable device 100 relative to position determination system 125. This allows determining the precise position of image capture device 110 relative to the position fix generated by position determination system 125.

In FIG. 1, integrated field-portable device 100 further comprises an azimuth determination component 130 which is configured to determine a direction in which integrated field-portable device 100, and/or image capture device 110, is facing when image 115 is captured. In accordance with various embodiments, azimuth determination component 130 can comprise, but is not limited to a solid-state compass, a gyrocompass, and an engraved protractor. Alternatively, a velocity vector can be determined when integrated field-portable device 100 is in motion using position determination system 125 (e.g., a plurality of GNSS receivers and antennas) such as when integrated field-portable device 100 is mounted with a known orientation to an axis of motion. In accordance with another embodiment, azimuth determination component 130 can receive a manually entered indication of the direction in which integrated field-portable device 100 is facing such as when integrated field-portable device 100 is oriented in a known direction.

In FIG. 1, integrated field-portable device 100 further comprises satellite position calculator 135 which is configured to determine an expected position of at least one Global Navigation Satellite System (GNSS) satellite. In accordance with one embodiment, satellite position calculator 135 receives data from position determination system 125 which indicates the position of integrated field-portable device 100. Additionally, satellite position calculator 135 receives data from azimuth determination component 130 indicating the direction in which image capture device 110 of integrated field-portable device 100 is facing. It is noted that satellite position calculator 135 can also access additional data which can be used to better determine the direction in which image capture device 110 is facing, or to determine objects within the field of view of image capture device 110. As an example, in one embodiment, sensor 170 of FIG. 1 is a tilt sensor which is configured to determine the pitch, tilt, or roll of image capture device 110 and/or integrated field-portable device 100 above or below an axis orthogonal to the Earth's gravitational axis. This permits precisely determining the orientation of integrated field-portable device 100 with respect to the geodetic local tangent plane on the survey point at which it is located. In one embodiment, integrated field-portable device 100 utilizes leveling sensors to facilitate properly leveling when capturing image 115. Additional data which is available to satellite position calculator 135 in accordance with various embodiments includes the field of view and focal length of image capture device 110. For example, satellite position calculator 135 can leverage the existing knowledge of the performance parameters of image capture device 110 to determine what portion of the sky is visible to integrated field-portable device 100 based upon azimuth and tilt data received from azimuth determination component 130 and sensor 170 respectively. In accordance with various embodiments, a timestamp (e.g., either in GPS time, UTC time, elapsed time, etc.) is generated each time image capture device 110 is used to capture image 115.

In accordance with various embodiments, satellite position calculator 135 is also configured to determine the location of one or more GNSS satellites that are within the field of view of image capture device 110. For example, satellite position calculator 135 can access GNSS satellite almanac data which can be stored in, for example, non-volatile memory 610 of FIG. 6, volatile memory 608 of FIG. 6, data storage unit 612 of FIG. 6, or peripheral computer readable storage media 602 of FIG. 6. Satellite position calculator 135 can also access GNSS satellite ephemeris data which is sent from GNSS satellites and is received by a GNSS receiver such as position determination system 125, or a combination of almanac and ephemeris data as well. In accordance with one embodiment, integrated field-portable device 100 can receive satellite position data (e.g., ephemeris and/or almanac data) from another source such as a ground station or communication satellite using wireless transceiver 165. Using this data, satellite position calculator 135 can determine the respective position of GNSS satellites including their direction from integrated field-portable device 100 and their elevation with respect to the horizon. In accordance with various embodiments, satellite position calculator 135 determines where in a given image 115 one or more GNSS satellites are located, even if the satellite(s) are not visible in image 115 itself. In accordance with one embodiment, satellite position calculator 135 generates expected GNSS satellite position data 140 which is received by annotation system 120.

In accordance with various embodiments, annotation system 120 is configured to receive image 115, expected GNSS satellite position data 140, and a configurable template 150 which designates an instance of additional data (e.g., 122 of FIG. 1) which is associated with image 115 and which designates a selected region of image 115 to which at least one border is located where the additional data 122 is to be appended to image 115. As will be discussed in greater detail below, annotation interface 145 can be used to configure the manner in which data is appended to image 115 based upon selected parameters. In accordance with various embodiments, a user can designate data which is to be associated and/or appended to image 115, as well as the location of image 115 to which each instance of data will be appended. In accordance with various embodiments, an operator of integrated field-portable device 100 uses annotation interface 145, which is displayed for example on display device 618 of FIG. 6, to select or designate various types of additional data (e.g., 122 of FIG. 1) which are to be associated and/or appended to image 115. In so doing, configurable template 150 is created and is used by annotation system 120 to associate the designated data into image 115. It is noted that the creation of configurable template 150 can be performed in the field without the necessity of additional devices such as other computer systems. Additionally a pre-defined configurable template may be accessed and utilized. Furthermore, the appending of designated data to image 115 can be performed automatically when image 115 is captured or stored by integrated field-portable device 100. In response to appending data to image 115 in accordance with configurable template 150, annotation system 120 generates appended image data 121 comprising image 115, the position of at least one target in a survey target area captured in image 115, and additional data 122.

In accordance with various embodiments, storage system 155 is configured to receive the appended image data 121 from annotation system 120 and to generate a digital representation 160 comprising image 115, as well as the position of the target in the survey target area and additional data 122 in accordance with the instructions comprising configurable template 150. In accordance with various embodiments, the data appended to image 115 in the form of digital representation 160 is embedded into the image. In other words, the image data (e.g., image 115), the position of the target in the survey target area, and additional data 122 comprise an integrated set of data in the form of digital representation 160 as opposed to separate instances of overlaid data. In accordance with one embodiment, the data appended to image 115 can be stored separately from image 115. In accordance with one embodiment, data appended to image 115 can be stored in one computer-readable format (e.g., in database 630 of FIG. 6) while image 115 is stored in a second format (e.g., a JPEG file in a second location). In one embodiment, digital representation 160, and additional data associated with it, is stored in the exchangeable image file format (EXIF). In accordance with various embodiments, digital representation 160 can be created automatically in response to receiving an indication to capture image 115, or a specific command to save digital representation 160. In one embodiment, a user of integrated field-portable device 100 can access image 115 via display device 618 and, using annotation interface 145, create configurable template 150 prior to saving digital representation 160.

In accordance with various embodiments, wireless transceiver 165 is configured to operate on any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard. Wireless transceiver 165 can be used to receive navigation data used to in conjunction with position determination system 125 to determine the position of integrated field-portable device 100. As described above, this can include GNSS ephemeris data, GNSS satellite almanac data, measured or extrapolated signal error data, real-time signal corrections based upon carrier signal or carrier phase observables, atmospheric signal delay data, and the like which can be used by position determination system 125 in generating a more precise estimate of the current position of integrated field-portable device 100. Wireless transceiver 165 can also be used to send data such as image 115, digital representation 160, or expected GNSS satellite position data 140 in real-time to a remote location. Wireless transceiver 165 can receive commands to operate or point integrated field-portable device 100 in a given direction or successive series of directions and to perform other data gathering and recording operations as well such as recording an azimuth, elevation, and distance to a target in a survey target area.

Sensor 170 is configured to provide supplemental or additional data used by integrated field-portable device 100 to determine a position fix and/or append data to image 115 in accordance with various embodiments. Additionally, sensor 170 is configured to provide data to integrated field-portable device 100 which facilitates measuring and recording data about a target in a target area. Examples of additional sensor elements comprising sensor 170 include, but are not limited to, additional GNSS receivers and antennas, pitch-tilt-roll sensors, inertia sensors configured to determine motion of integrated field-portable device 100, distance measurement sensors (e.g., laser range finding equipment, audio range finding equipment, etc.), image capture devices, communication devices, radio-frequency identification (RFID) devices, barcode readers, leveling sensors, etc.

Figure 2:
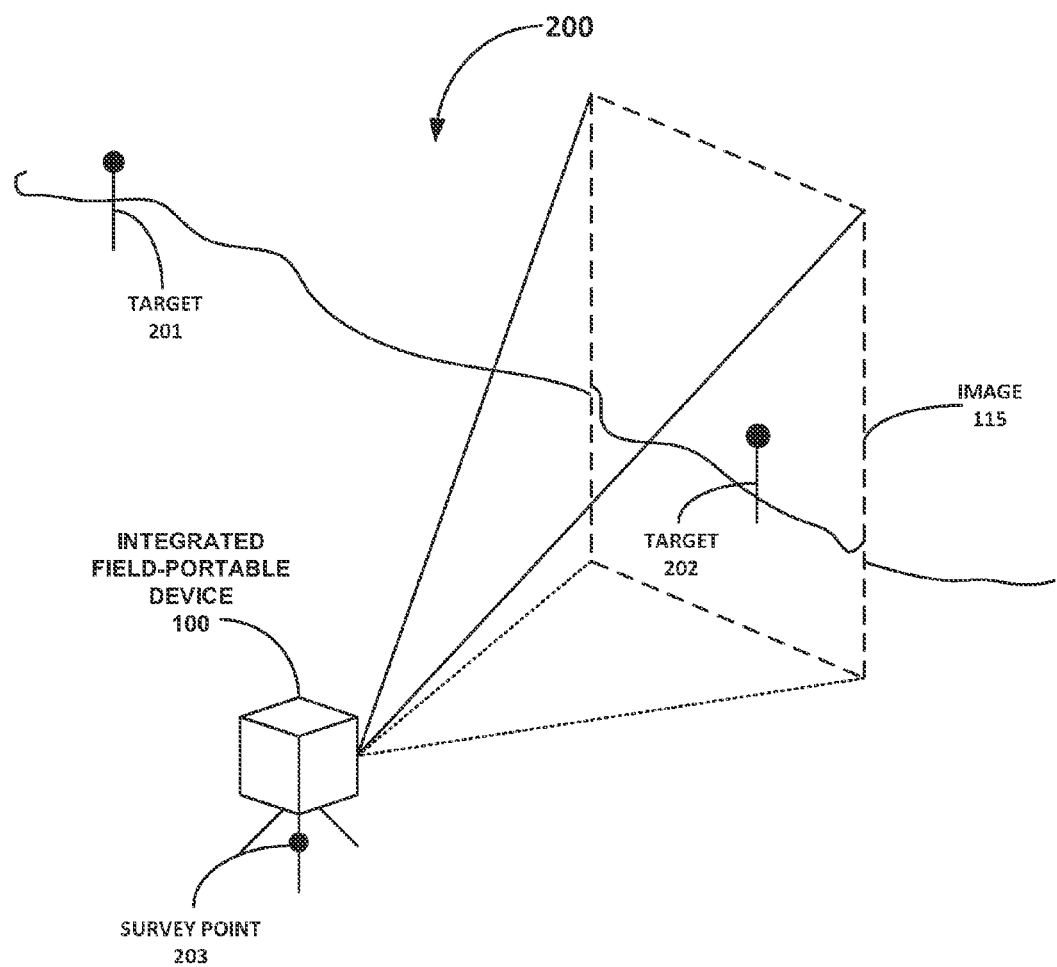
FIG. 2 shows an example integrated field-portable device capturing an image of a survey target area in accordance with an embodiment.

FIG. 2 shows an example of an integrated field-portable device 100 capturing an image of a survey target area in accordance with various embodiments. In FIG. 2, integrated field-portable device 100 is shown capturing an image 115 of a target 202 which is located in a survey target area 200. Also shown in FIG. 2 is a second target 201 which is outside of survey target area 200. In accordance with various embodiments, integrated field-portable device 100 is configured to collect a variety of data about a target survey area. Some types of data recorded by integrated field-portable device 100 include, but are not limited to, the current position of integrated field-portable device 100 such as a latitude, longitude of integrated field-portable device 100, or with reference to a local reference system. Additional data 122 can include, but is not limited to, a timestamp of when image 115 is capture, current date, the elevation of integrated field-portable device 100, the direction which integrated field-portable device 100 is facing when image 115 is captured, the current time, the distance from target 202 to integrated field-portable device 100, an azimuth from target 202 to integrated field-portable device 100, an elevation of target 202 relative to integrated field-portable device 100, a direction and distance from integrated field-portable device 100 to a previously recorded target (e.g., 201 of FIG. 2), a direction and distance from a current target (e.g., 202 of FIG. 2) to a previously recorded target (e.g., 201 of FIG. 2), an elevation of a target (e.g., 202 of FIG. 2), an identifier (e.g., an object name, code, or other identification) of the survey target area, an identifier of the target, a classification of the target, and a previously recorded position of a survey point (e.g., 203) when image 115 is captured by integrated field-portable device 100. Classification of a target can include, but is not limited to, what the target is (e.g., tree, fire hydrant, telephone pole, marker, etc.), a description of the type of target being recorded (e.g., point, boundary, or the like), a condition of the target (e.g., healthy, damaged, missing, etc.), or a description of a feature which will be located at the target point such as where a building or parking lot it to be built. In one embodiment, a user can record the position of target 202 using position determination system 125. The user can then step away a short distance and capture image 115 of the target 202. In accordance with various embodiments, integrated field-portable device 100 will automatically associate the recorded position of target 202 with captured image of target 202. Additionally, in one embodiment integrated field-portable device 100 will append the azimuth in which it is facing when image 115 is captured in order to facilitate finding the target 202 later by another user. In one embodiment, a user can capture a first image of the survey point 203 (e.g., from a few meters away) which integrated field-portable device 100 will be situated above when capturing an image 115 of target 202 within the survey target area. As described above, the user can annotate data to the captured image 115 of the survey point 203 which provides an accurate description to facilitate finding it later. The user can then situate integrated field-portable device 100 above survey point 203 and capture a second image 115 which shows target 203 within the survey target area. In one embodiment, the position information generated when integrated field-portable device 100 is situated above survey target 203 can be annotated to the image showing survey point 203 to provide a more precise measure of the position of survey point 203.

Example of Embedding Expected GNSS Satellite Position Data

Figure 3A:
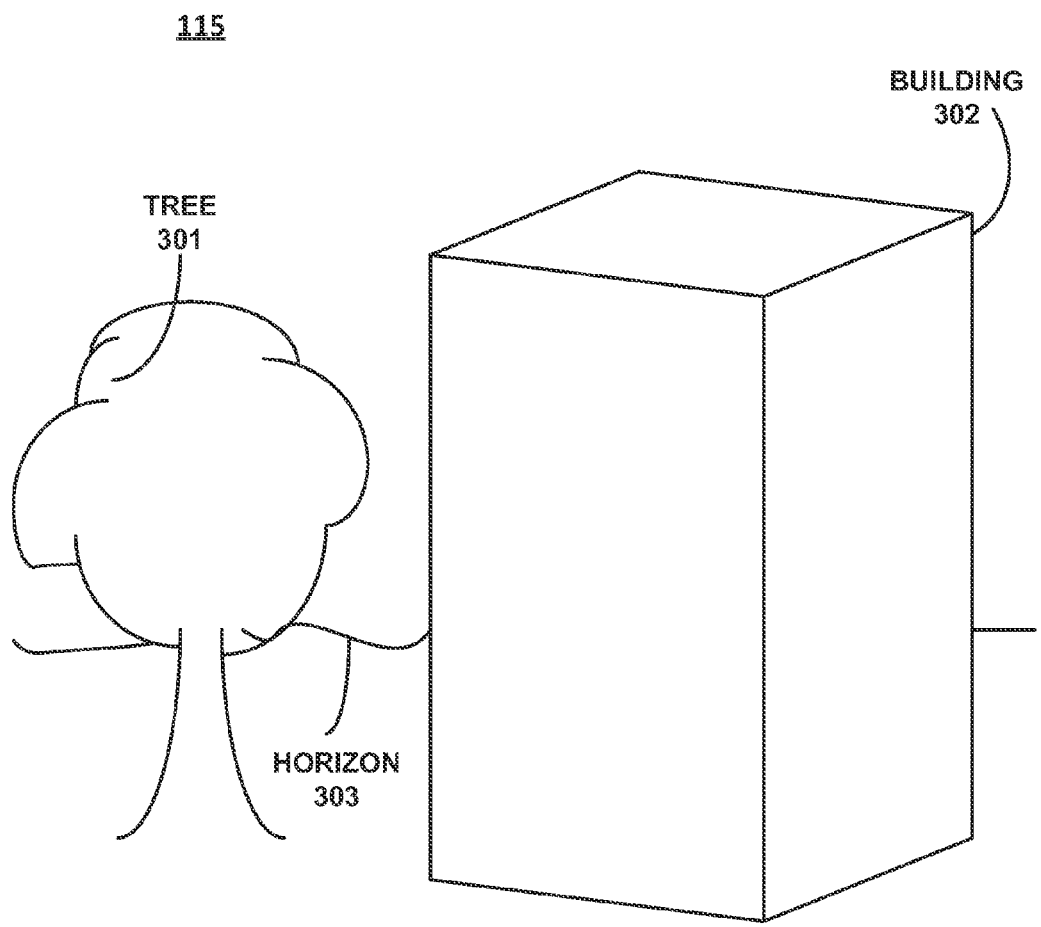
FIG. 3A shows an example image captured by an integrated field-portable device in accordance with an embodiment.

FIG. 3A shows an example image 115 which is captured by an integrated field-portable device 100 in accordance with various embodiments. In FIG. 3A, image 115 comprises a view of survey target area 200 which comprises a tree 301, a building 302, and a horizon line 303. It is well known in the field of satellite navigation systems that a clear field of view to orbiting GNSS satellites is preferred. If there is an obstruction in the line-of-sight between a GNSS antenna and a given satellite in view of the antenna, the signal from the obstructed GNSS satellite can be blocked, or distorted (e.g., due to attenuation, signal refraction, or multipath distortion) which in turn degrades the precision of generating a position fix. In accordance with various embodiments, integrated field-portable device 100 is configured to record data which can facilitate identifying features within its field of view of view which may degrade signal reception from one or more GNSS satellites. In the example of FIG. 3A, tree 301 and building 302 may interfere with, or degrade, the reception of GNSS signals from one or more GNSS satellites within the field of view of integrated field-portable device 100.

Figure 3B:
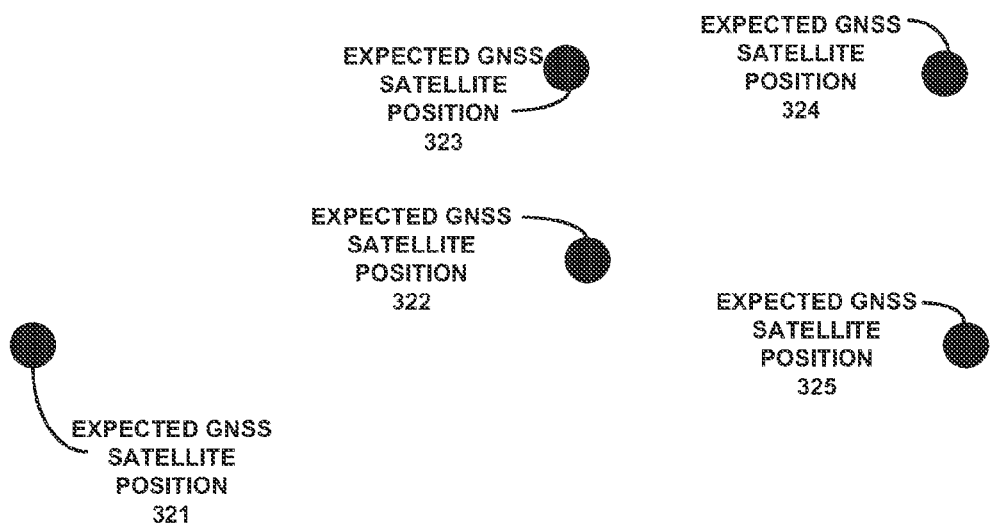
FIG. 3B shows an example of expected GNSS satellite position data in accordance with various embodiments.

FIG. 3B shows an example of expected GNSS satellite position data 140 in accordance with various embodiments. As was discussed above, integrated field-portable device 100 is configured to determine its position using position determination system 125. In accordance with various embodiments, integrated field-portable device 100 is further configured to determine the location/position of each GNSS satellite within its field of view at a given time. For example, using the clock data from GNSS receiver 500, or a local clock, as well as satellite position data, integrated field-portable device 100 can determine the location of each GNSS satellite above horizon line 303. In accordance with various embodiments, integrated field-portable device 100 can access a stored almanac describing the orbits of GNSS satellites, or receive ephemeris data (e.g., from the GNSS satellite itself via position determination system 125, or via a communication satellite via wireless transceiver 165). Using the current time and the satellite orbit data, satellite position calculator 135 can determine the location of each GNSS satellite above horizon line 303. In the example of FIG. 3B, satellite position calculator has determined an expected satellite location for each of satellite vehicles (SVs) 321, 322, 323, 324, and 325 which are in the field of view of image 115. It is noted that while FIGS. 3A and 3B show an image 115 having a limited field of view, image capture device 110 can capture a panoramic image, or an image of the entire sky depending upon the optical components with which it is configured. Additionally, while FIG. 3B only shows SVs (e.g., 321-325) within the field of view of image 115, integrated field-portable device 100 can also determine and track the expected location of GNSS satellites not in the field of view of image capture device 110, but nevertheless in the field of view of a GNSS antenna (e.g., 532 of FIG. 5) comprising GNSS receiver 500. Furthermore, integrated field-portable device 100 can also monitor and display the expected locations of GNSS satellites which are currently below the horizon line of image 115. In accordance with various embodiments, integrated field-portable device 100 can be configured to display the expected locations of GNSS satellites which are expected to rise above the horizon line within a selected time interval such as the next fifteen minutes after the time that image 115 is captured.

Figure 3C:
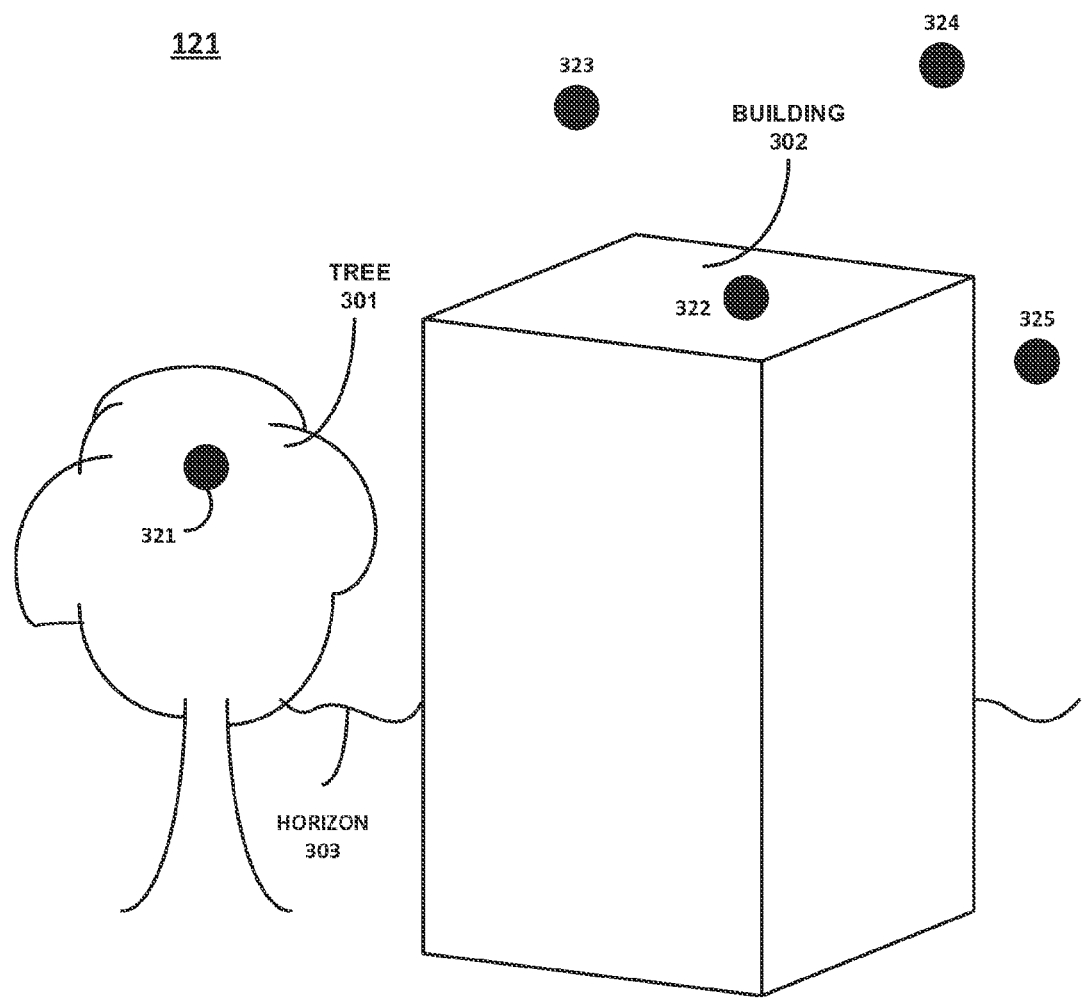
FIG. 3C shows an example image captured by an integrated field-portable device which is combined with expected GNSS satellite position data in accordance with an embodiment.

FIG. 3C shows an example image captured by an integrated field-portable device which is combined with expected GNSS satellite position data 140 in accordance with an embodiment. As described above, in accordance with various embodiments, annotation system 120 associates image 115 with additional data. In accordance with one embodiment, the additional data comprises the expected GNSS satellite position data 140 as shown in FIG. 3B. In so doing, appended image data (e.g., 121) is created comprising image 115 with the expected GNSS position of one or more GNSS satellites in the field of view of image capture device 110 simultaneously displayed. As a result, a user can determine whether a given GNSS satellite is blocked by an object, or if its signal may be degraded due to an obstruction. In FIG. 3C, the expected position of SV 321 coincides with the location of tree 301. As a result, signals from SV 321 may be blocked or degraded. Also, in FIG. 3C the expected position of SV 322 coincides with the location of building 302. Again, this can result in blocking or degradation of signals from SV 322. In FIG. 3C, it is shown that the expected positions of SV 323, SV 324, and SV 325 do not coincide with any object within the field of view of image 115. As a result, it is likely that the signal originating from each of these respective SVs is not degraded to the degree expected from SVs 321 and 322. Using this information, an operator of integrated field-portable device 100 can determine whether to use or omit signals from particular GNSS satellites in order to improve the precision of determining the position of integrated field-portable device 100. Alternatively, this information can be stored and used in post-processing of data in order to improve the precision of determining the position of integrated field-portable device 100. In accordance with various embodiments, the symbol each of SV 321, SV 322, SV 323, SV 324, and SV 325 is embedded within image 115 such that it cannot be removed without destroying all data at those pixel positions of image 115.

Figure 3D:
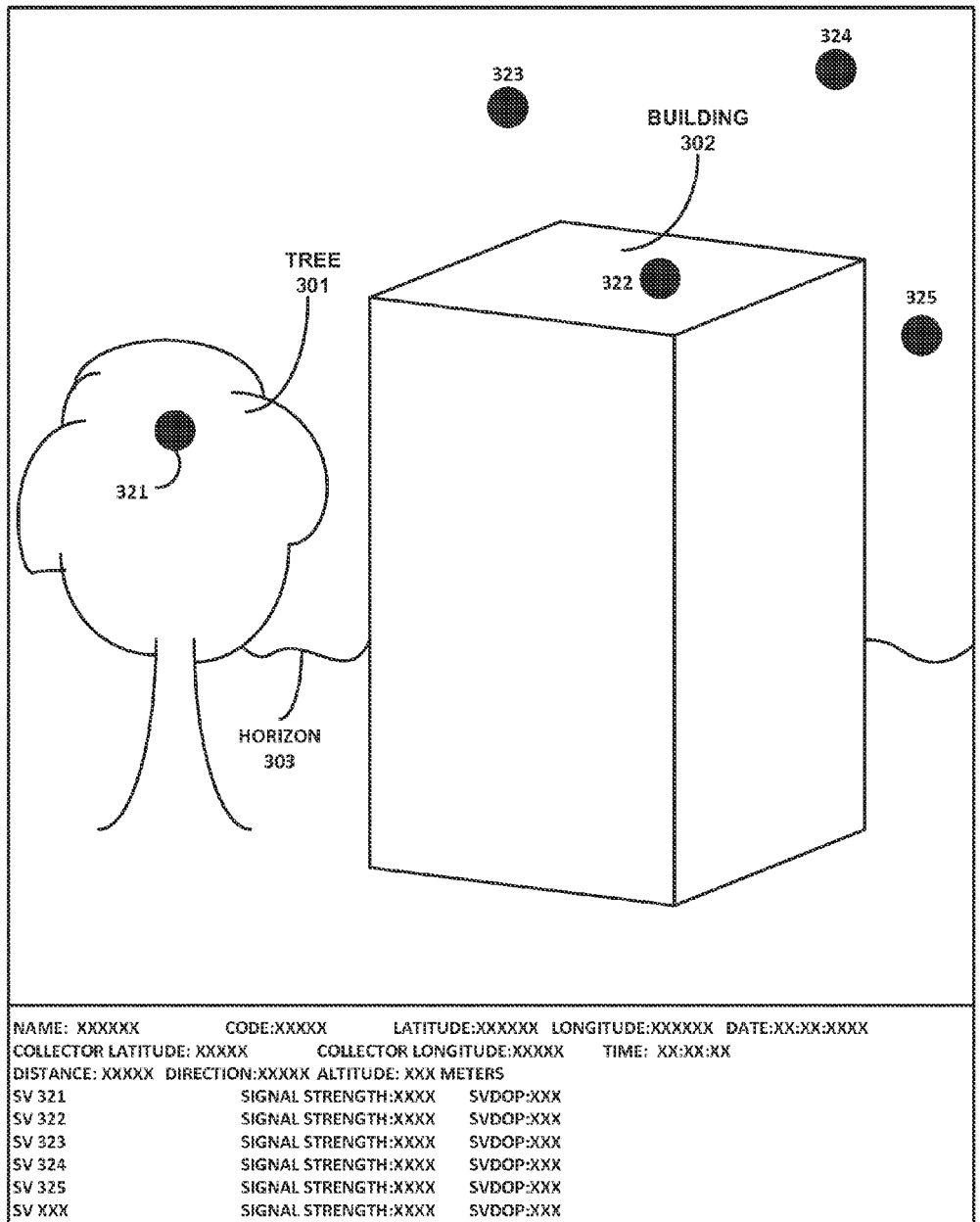
FIG. 3D shows appended image data in accordance with various embodiments.

FIG. 3D shows appended image data 11 in accordance with various embodiments. In FIG. 3D, a border 350 has been appended to image 115. In accordance with various embodiments annotation system 120 uses the data from configurable template 150 to determine what data to append to image 115 and where to place that data within image 115. In accordance with various embodiments, annotation system 120 appends one or more borders (e.g., border 350) such that the border becomes an embedded object within image 115. In other words, border 350 is embedded within image 115 such that it cannot be removed without destroying all data at those pixel positions of image 115. In the example of FIG. 3D, data appended to image 115 comprises the symbols designating the expected GNSS satellite positions of SVs (e.g., 321-325 of FIG. 3D) in view of integrated field-portable device 100. Within border 350, data appended to image 115 comprises the name of the target within the survey target area, a code identifying the target, the latitude and longitude of integrated field-portable device 100 (e.g., collector latitude and collector longitude respectively in FIG. 3D), the latitude and longitude of the target, the altitude (e.g., of integrated field-portable device 100 and/or target 202), the date when image 115 is captured, a timestamp of when image 115 is captured, a direction integrated field-portable device 100 is facing when image 115 is captured, and a distance from integrated field-portable device 100 to the target.

Additional data appended to image 115 comprises an identification of each SV in view of integrated field-portable device 100. It is noted that the additional data appended within border 350 comprises not only the SVs 321-325 which are shown to be in the field of view of image 115, but an additional SV XXX which is not in the field of view of image 115, but is in the field of view of antenna 532 of GNSS receiver 500. Furthermore, the additional data appended within border 350 comprises an indication of the respective signal strength of signals received from each SV in view of antenna 532 and an indication of the dilution of precision (DOP) for the satellite vehicle constellation as a whole in the field of view of antenna 532. In accordance with various embodiments, the respective signal strength for each SV in view of antenna 532 can be used to determine whether to use a signal from a given SV in determining the position of integrated field-portable device 100. For example, classification of the signal strength for each SV in view of integrated field-portable device 100 can be a measure of dB/Hz, a scale from 1-20 ANU, a ranking (e.g., unusable, questionable, usable, etc.), or another indication of the usability of the signal from a given SV. In accordance with various embodiments, GNSS receiver 500 can use the classification of the respective signal from each SV in view of antenna 532 when determining the position of integrated field-portable device 100 and to preferentially use signals from SVs having a usable signal strength when determining the position of integrated field-portable device 100.

Figure 3E:
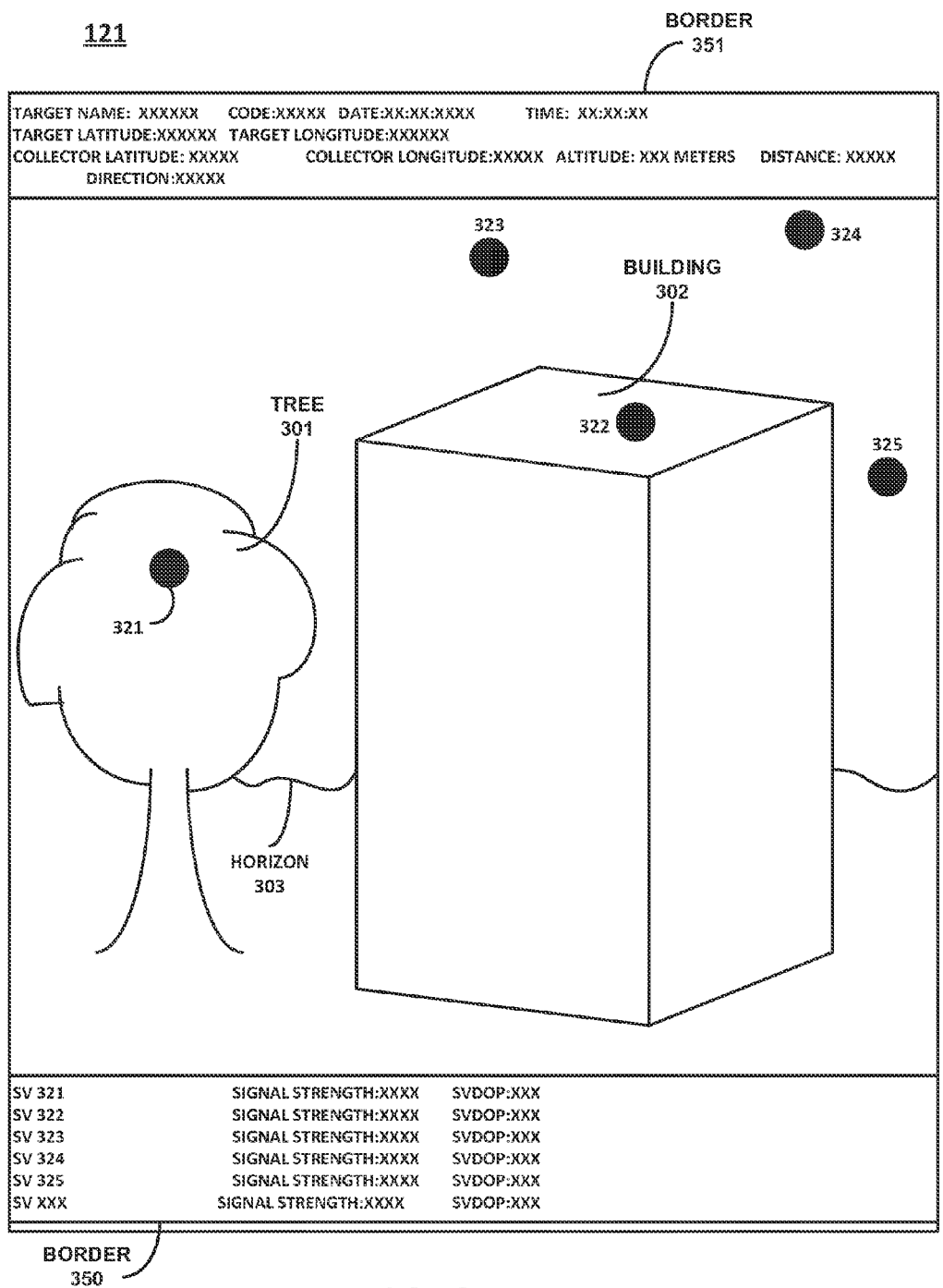
FIG. 3E shows appended image data in accordance with various embodiments.

In FIG. 3E, a second border 351 has been added to appended image data 121 by annotation system 120. As discussed above, configurable template 150 is used to determine what types of data to append to image 115, as well as where that data is appended. In the example of FIG. 3E, some of the data appended to border 350 of FIG. 3D is instead displayed in border 351. It is noted that additional borders can be appended to the left and right sides of image 115, or any combination of top, bottom, left, and right sides in accordance with various embodiments.

Figure 3F:
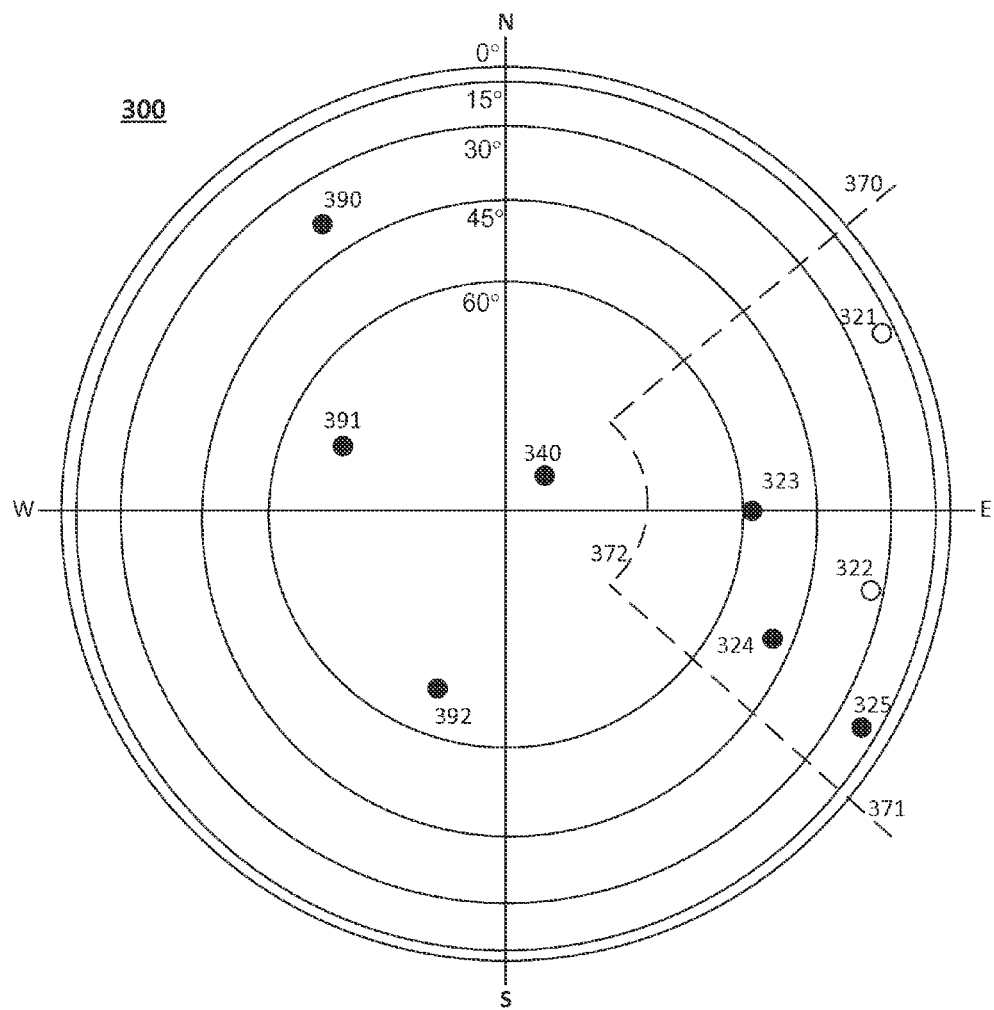
FIG. 3F shows an example sky plot of GNSS satellite vehicles in view of a ground station in accordance with various embodiments.

FIG. 3F shows an example sky plot 300 of GNSS satellite vehicles in view of a ground station in accordance with various embodiments. One currently implemented method for showing the positions of GNSS satellite vehicles utilizes a representation known as a "sky plot". A sky plot shows satellite vehicle positions or tracks on a zenithal projection centered on the position of a ground station (e.g., the position of integrated field-portable device 100). The sky plot can show tracks of GNSS satellite vehicles over a period of time such as a few minutes, hours, or an entire day. Alternatively, as shown in FIG. 3F, the sky plot can show the positions of GNSS satellite vehicles at a particular moment in time such as when image 115 is captured using image capture device 110. In accordance with various embodiments, image 115 can be appended with a time tag received from position determination system 125, another clock of integrated field-portable device 100, or a remotely located source of timing signals. The time tag associated with image 115 can be used to determine the locations of GNSS satellite vehicles in view of integrated field-portable device 100 when image 115 is captured as well as to display those locations on sky plot 300.

In FIG. 3F, sky plot 300 shows a zenithal projection indicating the cardinal directions (e.g., North, South, East, and West) as well as a plurality of rings indicating the elevation above the horizon. In FIG. 3F, the positions of GNSS satellite vehicles 321, 322, 323, 324, and 325 are displayed as well as other GNSS satellite vehicles (e.g., 340, 390, 391, and 392) which may be visible to a ground station such as integrated field-portable device 100 at the time image 115 is captured, but not within the field of view of image capture device 110. In FIG. 3F, lines 370 and 371 and arc 372 indicate the field of view of image capture device 110 as shown in, for example, FIGS. 3A, 3C, 3D, and 3E. In one embodiment, integrated field-portable device 100 is configured to project lines 370 and 371 and arc 372 onto sky view 300 to better represent which GNSS satellite vehicles are within the field of view of image capture device 110. For example, in FIG. 3F, sky plot 300 indicates that GNSS satellite vehicles 321, 322, 323, 324, and 325 are within the field of view indicated between lines 370 and 371 and arc 372. In accordance with various embodiments, identification data of each GNSS satellite vehicle (e.g., 321, 322, 323, 324, 325, 340, 390, 391, and 392) can be displayed in sky plot 300 as well as other data such signal strength for each of the satellite vehicles and the dilution of precision for the satellite vehicle constellation as a whole in view of integrated field-portable device 100. In one embodiment, annotation system 120 can use the data from sky plot, such as the azimuth and elevation data of GNSS satellite vehicles 321, 322, 323, 324, and 325 in determining where to annotate that data within appended image data 121 as shown in FIGS. 3C, 3D, and 3E. In one embodiment, annotation system 120 can use the signal strength data from the signals received from each SV in view of antenna 532 in determining how to represent the SV within the appended image data 121 or in sky plot 300. For example, in FIG. 3F, SV 321 and SV 322 are represented with open circles while SV 323, SV 324, and SV 325 are depicted with filled in circles. In the example of FIG. 3F, the open circles are used to indicate GNSS satellite vehicles which are obstructed from integrated field-portable device 100 when image 115 is captured. Similarly, the filled in circles are used to indicate GNSS satellite vehicles which are not obstructed from integrated field-portable device 100 when image 115 is captured.

Figure 3G:
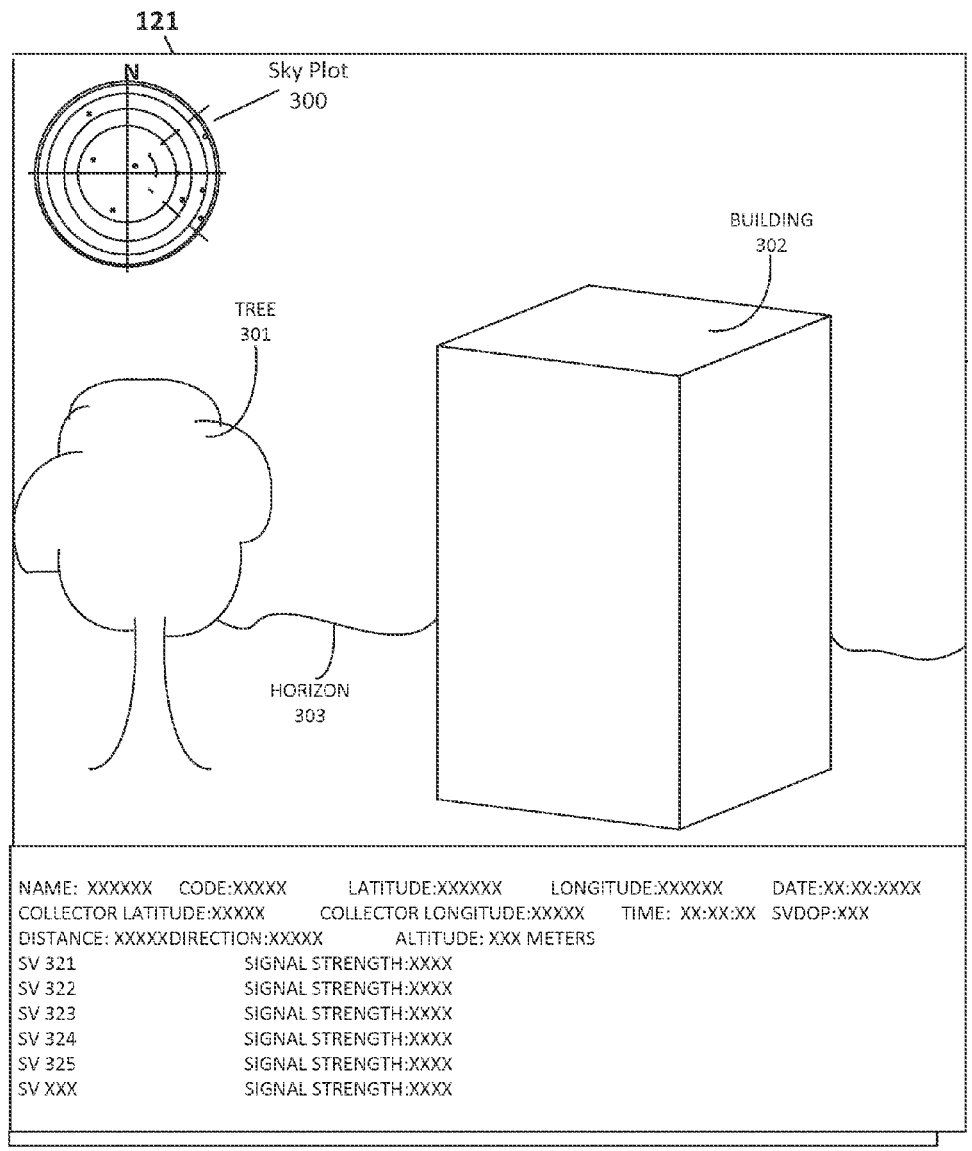
FIG. 3G shows appended image data in accordance with various embodiments.

FIG. 3G shows appended image data in accordance with various embodiments. In FIG. 3G, data appended to appended image data 121 comprises a small representation of sky plot 300 as described above with reference to FIG. 3F. For the purposes of clarity, some of the data shown in FIG. 3F, such as elevation notations, have been omitted from FIG. 3G. However, it is noted that some, or all, of the data of sky plot 300 shown in FIG. 3F can be included in the representation of sky plot 300 displayed as appended image data 121. Again, the data identifying each GNSS satellite vehicle in view of integrated field-portable device 100, as well as other data such as signal strength for each of the satellite vehicles and the dilution of precision for the satellite vehicle constellation as a whole, can be displayed in appended image data 121.

Figure 3H:
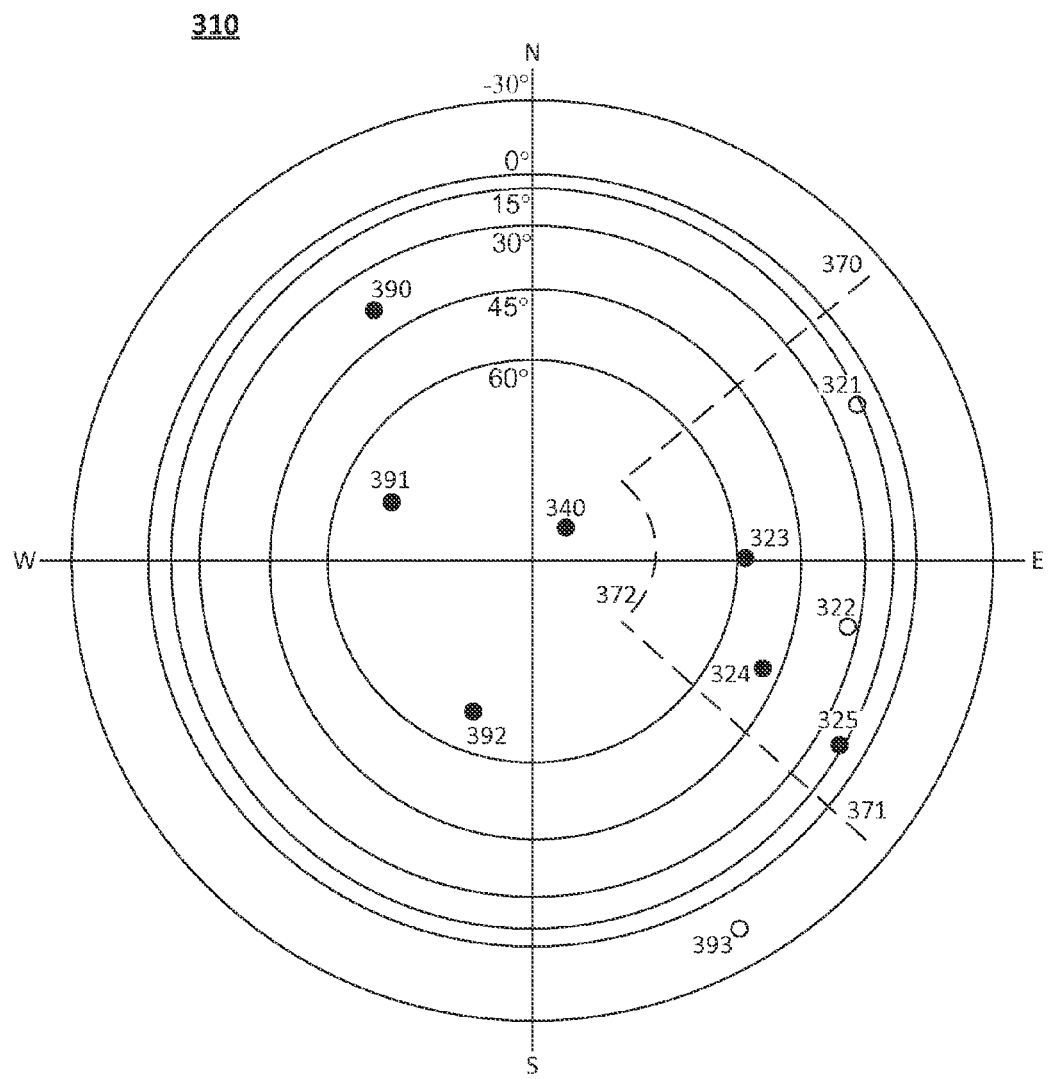
FIG. 3H shows an example sky plot of GNSS satellite vehicles in accordance with various embodiments.

FIG. 3H shows an example sky plot 310 in accordance with various embodiments. In FIG. 3H, sky plot 310 shows a zenithal projection indicating the cardinal directions (e.g., North, South, East, and West) as well as a plurality of rings indicating the elevation above the horizon as described above with reference to FIG. 3F. Furthermore, sky plot 310 includes an additional ring indicating an elevation of −30 degrees below the horizon. In accordance with various embodiments, integrated field-portable device 100 can utilize GNSS satellite almanac data and/or ephemeris data to determine the expected location of GNSS satellites. In accordance with an embodiment, this data can be used to plot the expected location of GNSS satellites which are not in view of image capture device 110 when image 115 is captured. For example, the expected location of SV 393 is shown in FIG. 3H as being below the horizon line when sky plot 310 is generated. In accordance with various embodiments, the determination of which SVs to display in sky plot 310 can be based upon selected criteria. For example, the expected locations of SVs which will be rising above the horizon can be displayed as opposed to SVs which will be moving farther away from integrated field-portable device 100. The angular measure of how far below the horizon line (e.g., −30 degrees below the horizon) can also be selected in accordance with various embodiments. Alternatively, the selection of SVs to be displayed can be based upon a selected time interval between when image 115 is captured and the expected time the SV will appear above the horizon. As an example, based upon a current expected position of a GNSS satellite, and its projected trajectory, satellite position calculator 135 can determine a time interval when the GNSS satellite will appear above the horizon. In accordance with various embodiments, if a GNSS satellite is expected to appear above the horizon within a selected time interval (e.g., five minutes) from the time image 115 is captured, its expected position is displayed on sky plot 310.

Example Annotation Interface

FIG. 4 shows an example annotation interface 145 used in accordance with various embodiments. In FIG. 4, an operator of integrated field-portable device 100 is presented with a list of various types of data which can be appended to image 115. In accordance with various embodiments, annotation interface 145 presents an operator of integrated field-portable device 100 with a pre-defined list of data types which can be appended to image 115, as well as where on image 115 each data type is to be located. In FIG. 4, a first data type is collector position (401). In accordance with one embodiment, collector position refers to the geographic position of integrated field-portable device 100 when image 115 is captured. When an operator of integrated field-portable device 100 selects the box next to collector position 401 (e.g., using alphanumeric input device 614, cursor control device 616, or a touch-screen display device 618 of FIG. 6) annotation interface 145 initiates creating configurable template 150 which will comprise the position of the data collecting device (e.g., integrated field-portable device 100). Also shown associated with collector position 401 are a series of locations (e.g., left, right, top, and bottom) which permit an operator of integrated field-portable device 100 to select where a border displaying collector position 401 is to be appended to image 115 if collector position 401 is selected to be appended to image 115. It is noted that a sub-menu (not shown) may be displayed when an operator of integrated field-portable device 100 selects displaying collector position 401. This permits the operator to further configure the data displayed when collector position 401 is selected. For example, a user could configure the coordinate system (e.g., latitude and longitude, or a local reference system) which is used to determine the location of integrated field-portable device 100 when image 115 is captured. In FIG. 4, target position (402) refers to the geographic location of a target (e.g., target 202 of FIG. 2) when image 115 is captured. In one embodiment, using the current position of integrated field-portable device 100, the azimuth to target 202, and a distance to target 202, integrated field-portable device 100 can determine the geographic coordinates of target 202 when image 115 is captured. Again, this information can be displayed at the top, bottom, right side, or left side of image 115 based upon operator selection.

Target direction 403 refers to an azimuth from integrated field-portable device 100 to target 202 when image 115 is captured. Again, a sub-menu (not shown) can be displayed when target direction 403 is selected which allows an operator to select the manner in which azimuth data is displayed. This can include, but is not limited to, displaying an azimuth in degrees, grad, mils, etc. Target distance 404 refers to a distance from integrated field-portable device 100 to target 202 when image 115 is captured. As described above, in accordance with one embodiment sensor 170 comprises a distance measuring device such as a laser range finder configured to measure the distance between integrated field-portable device 100 and a target object. If an operator selects target distance 404, a sub-menu (not shown) can be displayed allowing the operator to select the unit of length (e.g., feet, meters, yards, miles, kilometers, etc.) in measuring this distance. SV signal strength 405 refers to a determination of the strength of the radio signal from a given SV to antenna 532 of GNSS receiver 500. SV DOP 406 refers to a determination of the dilution of precision for the satellite vehicle constellation as a whole as described above which can be used to improve the precision of determining the position of integrated field-portable device 100. Target code 407 refers to a classification of target 202 which allows an operator to classify target 202 when image 115 is captured. Again, a sub-menu can be displayed when target code 407 is selected to permit an operator to select a classification of target 202. The classification of target 202 can be performed by selecting from a menu of pre-designated classifications, or entered manually using, for example, alphanumeric input device 614. Target condition 408 refers to describing the condition of target 202 when using integrated field-portable device 100, for example, in an asset management application. File extension 409 refers to what data format digital representation 160 will be saved by storage system 155. As shown in FIG. 4, appended image data 121 can be saved in a variety of data formats including, but limited to, a graphics interchange format (GIF) format file, a joint photographic experts group (JPEG) format file, an exchangeable image file (EXIF) format file, and a bitmap file. This allows greater flexibility in delivering an image which is formatted to best suit the needs of a particular customer. Embed SV positions 410 refers to embedding symbols or other indications of the expected satellite positions (e.g., 321-325 of FIGS. 3D and 3E). Date 412 refers to the current date when image 115 is captured. Timestamp 413 refers to the current time (e.g., GPS time, UTC time, elapsed time, etc.) when image 113 is captured. Appending timestamp information allows a play-back of the images showing the movement over time of GNSS satellites with respect to objects within a survey target area. Altitude 414 refers to the altitude (e.g., of integrated field-portable device 100 and/or target 202) when image 115 is captured.

When an operator of integrated field-portable device 100 has selected the desired data types for appending to image 115, and where each of the data types is to be located, the operator can select save button 411 to save the configuration settings. In so doing, integrated field-portable device 100 will automatically generate a configurable template 150 which has one or more borders (e.g., 350 and 351 of FIG. 3E) as well as data fields which will be populated when image 115 is captured, or saved. Alternatively, in one embodiment, image 115 is captured and displayed on display device 618 prior to an operator accessing annotation interface 145. Upon selecting save button 411, image 115 is automatically saved with additional data appended in accordance with configurable template 150. In accordance with various embodiments, integrated field-portable device 100 stores specific data types at specific memory locations such as volatile memory 608, non-volatile memory 610, or data storage unit 612. Depending upon which data types have been selected for appending to image 115, integrated field-portable device 100 will retrieve the relevant data that has been selected using annotation interface 145 and append it to image 115 when it is captured or stored. In other words, the relevant data will be retrieved from the data locations and populated into the data fields without the need for further operator intervention.

The use of configurable template 150 provides greater flexibility to an operator of integrated field-portable device 100. For example, in accordance with one embodiment, some of the data types shown in FIG. 4 may be pre-selected in a default-type setting. Thus, the boxes proximate to pre-selected data types will already be selected when annotation interface 145 is first displayed to an operator of integrated field-portable device 100. However, the operator can de-select some or all of these data types as desired. Furthermore, one or more configurable templates 150 can be configured and saved for later use. Thus, depending upon what type of data is being collected, or what customer will be receiving the data, a specific configurable template 150 can be used to append data to image 115. Additionally, the configurable templates allow creating a standardized format for presenting data. Thus, a company using integrated field-portable device 100 can use the same template parameters for each integrated field-portable device 100 which it operates. Any customer receiving data from that company will know in advance where to find specific data types (e.g., latitude and longitude data in top border 351, SV data in lower border 350, etc.).

Example GNSS Receiver

Figure 5:
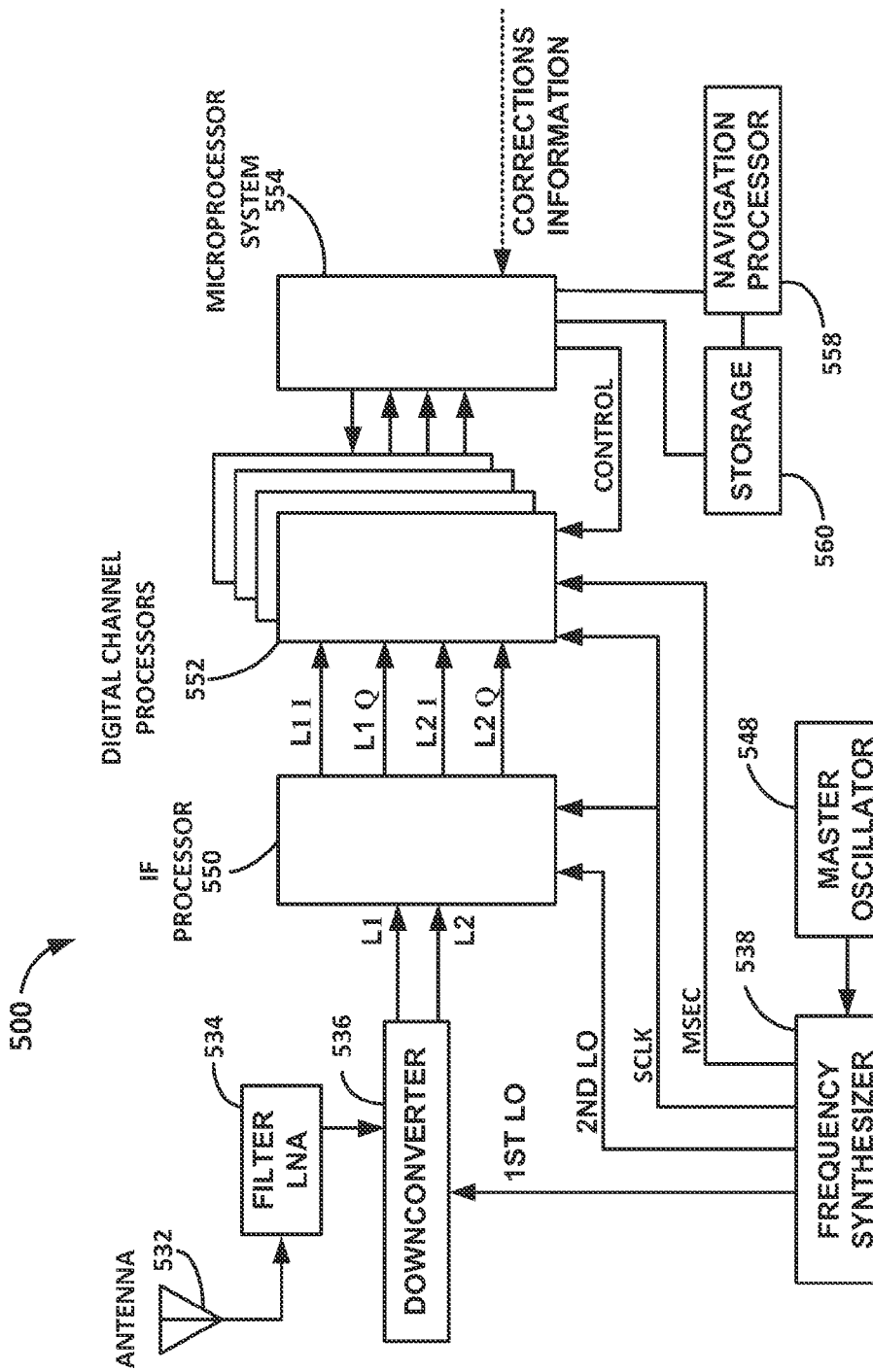
FIG. 5 illustrates a block diagram of an example GNSS receiver that may be used in accordance with some embodiments.

FIG. 5, shows an example GNSS receiver 500, according to one embodiment which may be utilized all or in part one or more of position determination system 125 of FIG. 1. It is appreciated that different types or variations of GNSS receivers may also be suitable for use in the embodiments described herein. In FIG. 5, received L1 and L2 signals are generated by at least one GPS satellite. Each GPS satellite generates different signal L1 and L2 signals and they are processed by different digital channel processors 552 which operate in the same way as one another. FIG. 5 shows GPS signals (L1=1575.42 MHz, L2=1227.60 MHz) entering GNSS receiver 500 through a dual frequency antenna 532. Antenna 532 may be a magnetically mountable model commercially available from Trimble Navigation of Sunnyvale, Calif. Master oscillator 548 provides the reference oscillator which drives all other clocks in the system. Frequency synthesizer 538 takes the output of master oscillator 548 and generates important clock and local oscillator frequencies used throughout the system. For example, in one embodiment, frequency synthesizer 538 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 534 performs filtering and low noise amplification of both L1 and L2 signals. The noise figure of GNSS receiver 500 is dictated by the performance of the filter/LNA combination. The downconvertor 536 mixes both L1 and L2 signals in frequency down to approximately 175 MHz and outputs the analogue L1 and L2 signals into an IF (intermediate frequency) processor 550. IF processor 550 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 552 inputs the digitally sampled L1 and L2 inphase and quadrature signals. All digital channel processors 552 are typically are identical by design and typically operate on identical input samples. Each digital channel processor 552 is designed to digitally track the L1 and L2 signals produced by one satellite by tracking code and carrier signals and to from code and carrier phase measurements in conjunction with the microprocessor system 554. One digital channel processor 552 is capable of tracking one satellite in both L1 and L2 channels. Microprocessor system 554 is a general purpose computing device (such as computer system 1000 of FIG. 10) which facilitates tracking and measurements processes, providing pseudorange and carrier phase measurements for a navigation processor 558. In one embodiment, microprocessor system 554 provides signals to control the operation of one or more digital channel processors 552. Navigation processor 558 performs the higher level function of combining measurements in such a way as to produce position, velocity and time information for the differential and surveying functions. Storage 560 is coupled with navigation processor 558 and microprocessor system 554. It is appreciated that storage 560 may comprise a volatile or non-volatile storage such as a RAM or ROM, or some other computer readable memory device or media. In one rover receiver embodiment, navigation processor 558 performs one or more of the methods of position correction.

In some embodiments, microprocessor system 554 and/or navigation processor 558 receive additional inputs for use in refining position information determined by GNSS receiver 500. In some embodiments, for example, corrections information is received and utilized. Such corrections information can include differential GPS corrections, RTK corrections, and wide area augmentation system (WAAS) corrections.

Example Computer System Environment

Figure 6:
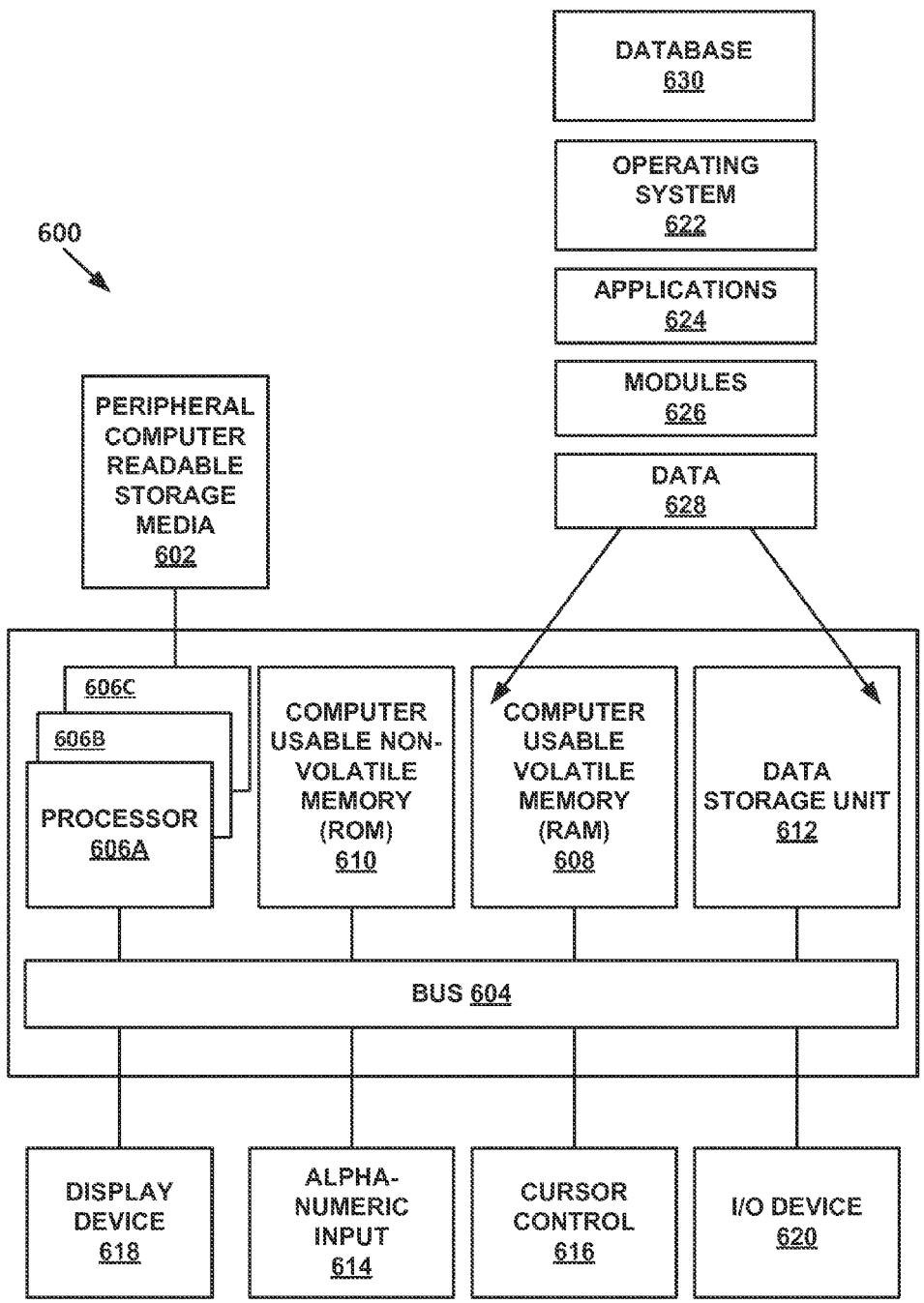
FIG. 6 illustrates a block diagram of an example computer system with which or upon which various embodiments may be implemented.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is only an example and that embodiments as described herein can operate on or within a number of different computer systems including, but not limited to, general purpose networked computer systems, embedded computer systems, server devices, various intermediate devices/nodes, stand alone computer systems, hand-held computer systems, multi-media devices, and the like. Computer system 600 of FIG. 6 is well adapted to having peripheral computer-readable storage media 602 such as, for example, a floppy disk, a compact disc, digital versatile disc, universal serial bus "thumb" drive, removable memory card, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g., random access memory (RAM), coupled to bus 604 for storing information and instructions for processors 606A, 606B, and 606C. System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. In one embodiment, system 600 also includes an optional display device 618 coupled to bus 604 for displaying information.

Referring still to FIG. 6, optional display device 618 of FIG. 6 may be a liquid crystal device, cathode ray tube, plasma display device or other display device suitable for creating graphic images and alphanumeric characters recognizable to a user. In one embodiment, display device 618 comprises a touch-screen assembly configured to detect the location of a touch on, or proximate to, the surface of display device. There are numerous implementations of a touch screen assembly known in the art which can be utilized as implementations of display device 618 including, but not limited to, resistive touch screen assemblies, capacitive touch screen assemblies, infrared touch screen assemblies, surface acoustic wave touch screen assemblies, and the like. Optional cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. System 600 is also well suited to having a cursor directed by other means such as, for example, voice commands System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, data 628, and database 630 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within volatile memory 608, computer-readable storage media within data storage unit 612, peripheral computer-readable storage media 602, and/or other tangible computer readable storage media.

Method of Recording Data with an Integrated Field-Portable Device

Figure 7:
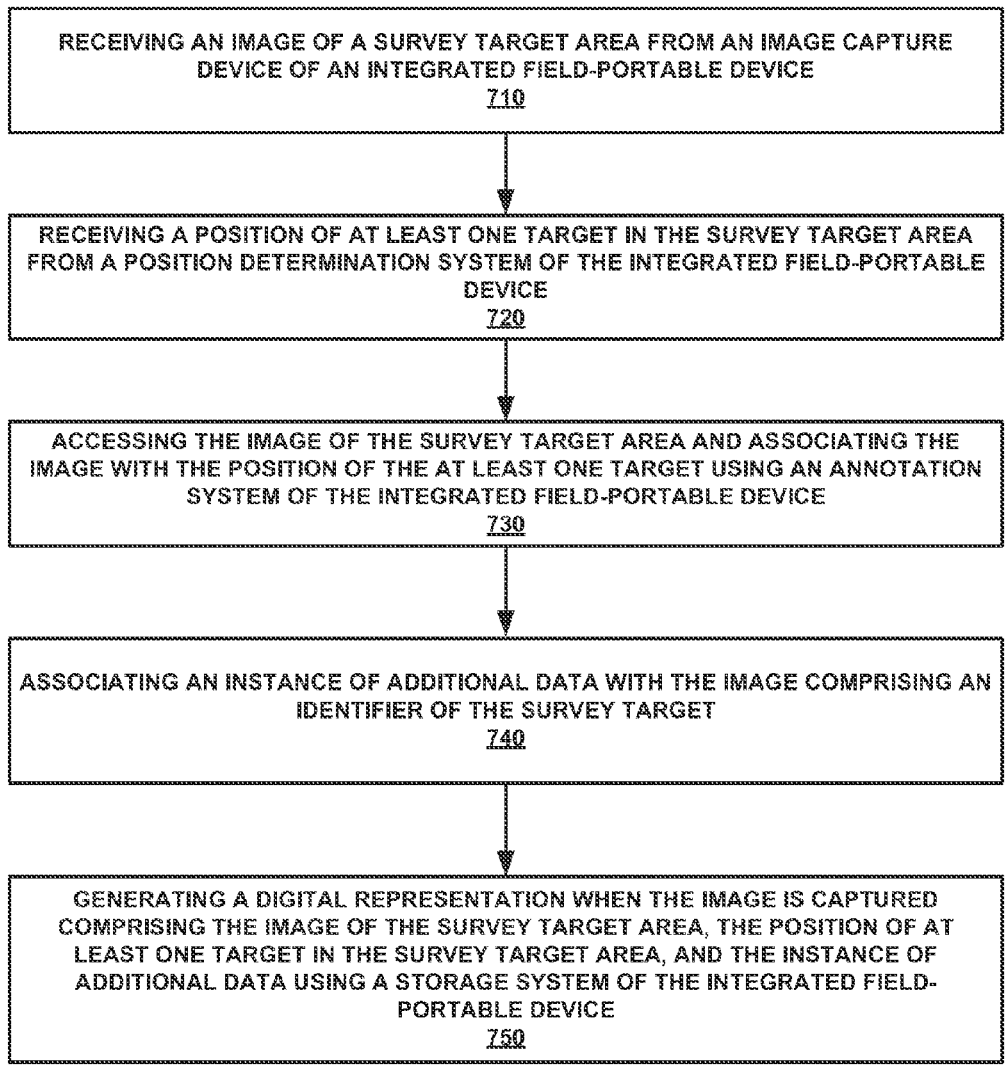
FIG. 7 is a flowchart of a method of recording data with an integrated field-portable device in accordance with one or more embodiments.

FIG. 7 is a flowchart of a method 700 of recording data with an integrated field-portable device in accordance with various embodiments. In operation 710 of FIG. 7, an image of a survey target area is received from an image capture device of an integrated field-portable device. As discussed above, integrated field-portable device 100 is configured to use image capture device 110 to capture an image 115 of a target (e.g., 202 of FIG. 2) in a survey target area (e.g., 200 of FIG. 2).

In operation 720 of FIG. 7, a position of at least one target in the survey target area is received. In accordance with various embodiments, integrated field-portable device 100 is configured to determine its position using position determination system 125. Additionally, integrated field-portable device 100 is configured to determine the position of other objects such as target 202 using various other sensors such as azimuth determination component 130 and sensor(s) 170 which can comprise range determination components, tilt sensors, or other components for measuring an azimuth and distance from integrated field-portable device 100 to target 202. In accordance with various embodiments, integrated field-portable device 100 uses this data to derive the position of target 202.

In operation 730 of FIG. 7, the image of the survey target area is accessed and associated with the position of the at least one target using an annotation system of the integrated field-portable device. In accordance with various embodiments, annotation system 120 is configured to access and display image 115 using display device 618. Furthermore, annotation system 120 is configured to associate, merge, or append, other data with image 115. The accessing of the image of the survey target area may be accomplished automatically by annotation system 120 or in response to a user input.

In operation 740 of FIG. 7, an instance of additional data is associated with the image using the annotation system. In one embodiment, the additional data comprises an identifier of the at least one target. Other additional data which can be associated with the image in accordance with various embodiments includes, but is not limited to, a classification of the at least one target, and the direction in which the integrated field-portable device is facing when the image is captured. As discussed above, annotation system 120 associates or appends additional data (e.g., 122 of FIG. 1) to image 115 based upon configurable template 150. In accordance with various embodiments, when a user selects what types of data to append to image 115, as well as the locations at which this data is to be located, annotation interface 145 generates configurable template 150 which conveys this information to annotation system 120. Annotation system 120 then creates borders (e.g., 350 and 351 of FIG. 3E) and populates data into the data fields within those borders. As discussed above, in various embodiments, the additional data, as well as the appended borders in which the additional data is located, is embedded within image 115 such that it cannot be removed without destroying all data at those pixel positions of image 115.

In operation 750 of FIG. 7, a digital representation is generated using a storage system of the integrated field-portable device when the image is captured, the digital representation comprising the image of the survey target area, the position of the at least one target, and the instance of additional data. In accordance with various embodiments, annotation system 120 generates appended image data 121 which is used by storage system 155 to create a stored digital representation 160. In accordance with various embodiments, appended image data 121 comprises image 115 as well as the position of target 202 and additional appended data as specified by configurable template 150. Storage system 155 formats digital representation 160 based upon the format specified in configurable template 150.

Embodiments of the present technology are thus described. While the present technology has been described in particular embodiments, it should be appreciated that the present technology should not be construed as limited to these embodiments alone, but rather construed according to the following claims.

What is claimed is:

1. An integrated field-portable device comprising:
   an image capture device configured to capture an image of a survey target area;
   a position determination system configured to determine a position of said integrated field-portable device;
   an annotation system configured to access said image of said survey target area and to associate said image with a position of at least one target in said survey target area, said annotation system further configured to associate an instance of additional data with said image, said instance of additional data comprising:
      an identifier of said survey target area;
   a storage system configured to generate a digital representation comprising said image of said survey target area, said position of said at least one target in said survey target area and said instance of additional data, and wherein said generating said digital representation is performed when said image is captured; and
   a satellite position calculator configured to determine an expected position of at least one Global Navigation Satellite System (GNSS) satellite within said image and wherein said annotation system is further configured to associate a symbol with said image which indicates said expected position of said at least one GNSS satellite.

2. The integrated field-portable device recited in claim 1 wherein said annotation system creates at least one border adjacent to said image wherein said position of at least one target in said survey target area and said instance of additional data is associated.

3. The integrated field-portable device recited in claim 2 wherein said annotation system uses a configurable template which designates said instance of additional data for associating with said image and which designates a selected region of said image to which said at least one border is located and to which said instance of additional data is to be associated.

4. The integrated field-portable device as recited in claim 1 wherein said instance of additional data about said survey target area further comprises:
   an identification of said at least one GNSS satellite which is in view of said integrated field-portable device when said image is captured; and
   a classification of a signal from said at least one GNSS satellite.

5. The integrated field-portable device as recited in claim 1 further comprising:
   an azimuth determination component configured to determine a direction in which said integrated field-portable device is facing when said image is captured and wherein said additional data additionally comprises said direction in which said integrated field-portable device is facing when said image is captured.

6. An integrated field-portable device comprising:
   an image capture device configured to capture an image of a survey target area;
   a position determination system configured to determine a position of said integrated field-portable device;
   a satellite position calculator configured to determine an expected position of at least one Global Navigation Satellite System (GNSS) satellite;
   an annotation system configured to access said image of said survey target area and to associate said image with a position of at least one target in said survey target area, said annotation system further configured to associate an additional datum with said image, said additional datum comprises:
      a symbol associated with said image which indicates said expected position of said at least one GNSS satellite; and
   a storage system configured to generate a digital representation comprising said image of said survey target area, said position of said at least one target in said survey target area and said additional datum, and wherein said generating said digital representation is performed when said image is captured.

7. The integrated field-portable device recited in claim 6 wherein said annotation system creates at least one border adjacent to said image wherein said position of said at least one target is associated.

8. The integrated field-portable device recited in claim 7 wherein said annotation system uses a configurable template which designates said additional datum for associating with said image and which designates a selected region of said image to which said additional datum is to be associated.

9. The integrated field-portable device as recited in claim 6 further comprising an azimuth determination component and wherein said annotation system is further configured to associate with said image:
   an identifier of said survey target;
   a classification of said survey target area; and
   a direction in which said integrated field-portable device is facing when said image is captured.

10. The integrated field-portable device as recited in claim 6 wherein said annotation system is further configured to associate with said image:
   an identification of said at least one GNSS satellite which is in view of said integrated field-portable device when said image is captured; and
   a classification of a signal from said at least one GNSS satellite.

11. An integrated field-portable device comprising:
   an image capture device configured to capture an image of a survey target area;
   a position determination system configured to determine a position of said integrated field-portable device;
   an azimuth determination component configured to determine an azimuth from said integrated field-portable device to at least one target in said survey target area;
   a distance determination component configured to determine a distance from said integrated field-portable device to said at least one target;
   an annotation system configured to access said image of said survey target area and to associate said image with a position of said at least one target, said annotation system further configured to associate an instance of additional data with said image, said instance of additional data comprising:
  said azimuth from said integrated field-portable device to said at least one target;
  said distance from said integrated field-portable device to said at least one target; and
a storage system configured to generate a digital representation comprising said image of said survey target area, said position of said at least one target and said instance of additional data, and wherein said generating said digital representation is performed when said image is captured.

12. The integrated field-portable device recited in claim 11 wherein said annotation system creates at least one border adjacent to said image wherein said position of said integrated field-portable device and said instance of additional data is associated.

13. The integrated field-portable device recited in claim 12 wherein said annotation system uses a configurable template which designates said instance of additional data for associating with said image and which designates a selected region of said image to which said instance of additional data is to be associated.

14. The integrated field-portable device as recited in claim 11 further comprising:
  a satellite position calculator configured to determine an expected position of at least one Global Navigation Satellite System (GNSS) satellite and wherein said annotation system is further configured to associate a symbol with said image which indicates said expected position of said at least one GNSS satellite.

15. The integrated field-portable device as recited in claim 14 wherein said instance of additional data about said survey target area further comprises:
  an identification of said at least one GNSS satellite which is in view of said integrated field-portable device when said image is captured; and
  a classification of a signal from said at least one GNSS satellite.

16. An integrated field-portable device comprising:
  an image capture device configured to capture an image of a survey target area;
  a position determination system configured to determine a position of said integrated field-portable device;
  an azimuth determination component configured to determine an azimuth from said integrated field-portable device to at least one target captured by said image capture device in said survey target area;
  a distance determination component configured to determine a distance from said integrated field-portable device to said at least one target;
  an annotation system configured to access said image of said survey target area and to associate said image with a position of said at least one target, said annotation system further configured to associate an instance of additional data with said image, said instance of additional data comprising:
    an azimuth from said integrated field-portable device to at least one previously recorded position;
    a distance from said integrated field-portable device to said at least one previously recorded position; and
  a storage system configured to generate a digital representation comprising said image of said survey target area, said position of said integrated field-portable device and said additional data, and wherein said generating said digital representation is performed when said image is captured.

17. The integrated field-portable device recited in claim 16 wherein said annotation system creates at least one border adjacent to said image wherein said position of said survey target area and said instance of additional data is associated.

18. The integrated field-portable device recited in claim 17 wherein said annotation system uses a configurable template which designates said instance of additional data for associating with said image and which designates a selected region of said image to which said instance of additional data is to be associated.

19. The integrated field-portable device as recited in claim 16 further comprising:
  a satellite position calculator configured to determine an expected position of at least one Global Navigation Satellite System (GNSS) satellite within said image and wherein said annotation system is further configured to associate a symbol with said image which indicates said expected position of said at least one GNSS satellite.

20. The integrated field-portable device as recited in claim 19 wherein said instance of additional data about said survey target area further comprises:
  an identification of said at least one GNSS satellite which is in view of said integrated field-portable device when said image is captured; and
  a classification of a signal from said at least one GNSS satellite.

21. An integrated field-portable device comprising:
  an image capture device configured to capture an image of a survey target area;
  an azimuth determination component configured to determine a direction in which said integrated field-portable device is facing when said image is captured;
  a satellite position calculator configured to determine an expected position of at least one Global Navigation Satellite System (GNSS) satellite;
  a position determination system configured to determine a position of said integrated field-portable device;
  a distance determination component configured to determine a distance from said integrated field-portable device to at least one target in said survey target area;
  an annotation system configured to:
    access said image of said survey target area and to associate said image with a position of said at least one target;
    utilize a configurable template which designates a selected region of said image to which said position of said at least one target is to be associated within at least one border generated by said annotation system and wherein said configurable template further designates an instance of an additional instance of data for associating to said image and which designates a selected region of said image to which said instance of additional data is to be associated within said at least one border, said instance of additional data comprising:
      an identifier of said survey target area;
      a classification of said survey target area;
      said azimuth from said integrated field-portable device to said at least one target;
      said distance from said integrated field-portable device to said at least one target;
      an azimuth from said integrated field-portable device to at least one previously recorded position;

a distance from said integrated field-portable device to said at least one previously recorded position;

an identification of said at least one GNSS satellite which is in view of said integrated field-portable device when said image is captured; and a classification of a signal from said at least one GNSS satellite;

a symbol associated with said image which indicates said expected position of said at least one GNSS satellite;

a symbol associated with said image which indicates said expected position of at least one GNSS satellite which is not within view of said integrated field-portable device; and said direction in which said integrated field-portable device is facing when said image is captured; and a storage system configured to generate a digital representation comprising said image of said survey target area, said position of said at least one target and said instance of additional data, and wherein said generating said digital representation is performed when said image is captured.

22. A non-transitory computer-readable storage medium comprising computer executable code for directing a processor to execute a method of recording data with an integrated field-portable device, said method comprising:

receiving an image of a survey target area from an image capture device of said integrated field-portable device;

receiving a position of at least one target in said survey target area from a position determination system disposed within said integrated field-portable device;

accessing said image of said survey target area and associating said image with said position of said at least one target using an annotation system of said integrated field-portable device;

determining an expected position of at least one Global Navigation Satellite System (GNSS) satellite within said image using a satellite position calculator of said integrated field-portable device;

associating a symbol with said image which indicates said expected position of said at least one GNSS satellite;

associating an instance of additional data to said image using said annotation system, said instance of additional data comprising:

an identifier of said at least one target; and generating, when said image is captured, a digital representation comprising said image of said survey target area, said position of said at least one target in said survey target area, and said instance of additional data using a storage system of said integrated field-portable device.

23. The non-transitory computer-readable storage medium of claim 22 wherein said method further comprises:

creating at least one border adjacent to said image using said annotation system and wherein said position of said at least one target and said instance of additional data is associated.

24. The non-transitory computer-readable storage medium of claim 23 wherein said creating at least one border further comprises:

receiving template data which designates said instance of additional data for associating with said image and which designates a selected region of said image to which position of said at least one target and said instance of additional data is to be associated.

25. The non-transitory computer-readable storage medium of claim 22 wherein said method further comprises:

associating an identification of said at least one GNSS satellite which is in view of said integrated field-portable device when said image is captured; and associating a classification of a signal from said at least one GNSS satellite.

26. The non-transitory computer-readable storage medium of claim 22 wherein said method further comprises:

receiving a direction in which said integrated field-portable device is facing when said image is captured from an azimuth determination component of said integrated field-portable device; and associating said instance of additional data to said image using said annotation system, said instance of additional data comprising said direction in which said integrated field-portable device is facing when said image is captured.

* * * * *